United States Patent [19]
Ishikawa et al.

[11] Patent Number: 5,315,392
[45] Date of Patent: May 24, 1994

[54] APPARATUS FOR DISPLAY AND SELECTION OF AVAILABLE TELEVISION CHANNELS

[75] Inventors: Yoji Ishikawa; Takashi Otani, both of Saitama, Japan

[73] Assignee: Sony Corporation, Tokyo, Japan

[21] Appl. No.: 852,726

[22] Filed: Mar. 17, 1992

[30] Foreign Application Priority Data

Mar. 29, 1991 [JP] Japan .................. 3-066108

[51] Int. Cl.$^5$ .............................. H04N 5/445
[52] U.S. Cl. .................. 348/570; 455/186.2; 348/734
[58] Field of Search ........... 358/147, 191.1, 192.1, 358/194.1; 455/151.1, 179.1, 154.1, 158.1, 158.4, 158.5, 186.2; H04N 5/50, 5/445

[56] References Cited

U.S. PATENT DOCUMENTS

| | | | |
|---|---|---|---|
| 4,228,541 | 10/1980 | Snedkerud et al. | 455/158.5 |
| 5,031,045 | 7/1991 | Kawasaki | 358/191.1 |
| 5,047,867 | 9/1991 | Strubbe et al. | 358/191.1 |
| 5,103,314 | 4/1992 | Keenan | 455/151.1 |
| 5,152,011 | 9/1992 | Schwob | 358/192.1 |
| 5,157,496 | 10/1992 | Kurosawa | 358/192.1 |
| 5,191,423 | 3/1993 | Yoshida | 358/194.1 |

*Primary Examiner*—Mark R. Powell
*Assistant Examiner*—Jeffrey S. Murrell
*Attorney, Agent, or Firm*—Lewis H. Eslinger; Jay H. Maioli

[57] ABSTRACT

A television channel selection apparatus for use with a television receiver having a number of available television channels. The television channel selection apparatus includes a pushbutton pad having a first pushbutton and a group of second pushbuttons. A television channel list is displayed on the television channel when the first pushbutton is depressed. The television channel list includes channel numbers listed in relation to the respective television channels. One of the second pushbuttons is selectively depressed to specify the corresponding channel number and thus to select the corresponding television channel.

3 Claims, 7 Drawing Sheets

| CHANNEL GUIDE n | | |
|---|---|---|
| 1 HBO | 2 DIS | 3 SHOW |
| 4 CNN | 5 CBS | 6 ABC |
| 7 ESPN | 8 MTV | 9 _ _ _ _ |
| D _ _ _ _ | 0 _ _ _ _ | E _ _ _ _ |

5,315,392

APPARATUS FOR DISPLAY AND SELECTION OF AVAILABLE TELEVISION CHANNELS

BACKGROUND OF THE INVENTION

This invention relates to a television channel selection apparatus for use with television receivers having a number of available television channels.

Various types of television channel selection apparatus have been used to select a desired one of television channels or stations available for television receivers. For example, a commander is provided to control a television receiver at a position remote from the television receiver. The commander includes a pushbutton pad having a number of pushbuttons provided thereon. The pushbuttons include the numerical digits (0–9) to enter a desired television channel or station number. With such a television channel selection apparatus, however, it is not easy for the operator to remember television channel numbers in connection with the respective television channels. This is true particularly when a great number of television channels are available for the television receiver.

SUMMARY OF THE INVENTION

It is a main object of the invention to provide an improved channel selection apparatus of the direct channel selection type which permits easy channel selection for television receivers having a number of available television channels.

There is provided, in accordance with the invention, a television channel selection apparatus for use with a television receiver having a number of available television channels. The television channel selection apparatus comprises means for producing a first command signal, and means responsive to the first command signal for displaying a television channel list on the television receiver. The television channel list includes channel numbers listed in relation to the respective television channels. The television channel selection apparatus also includes means for selectively producing one of second command signals specifying the respective channel numbers, and means responsive to the one second command signal for selecting a television channel related to the channel number specified by the one second command signal.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
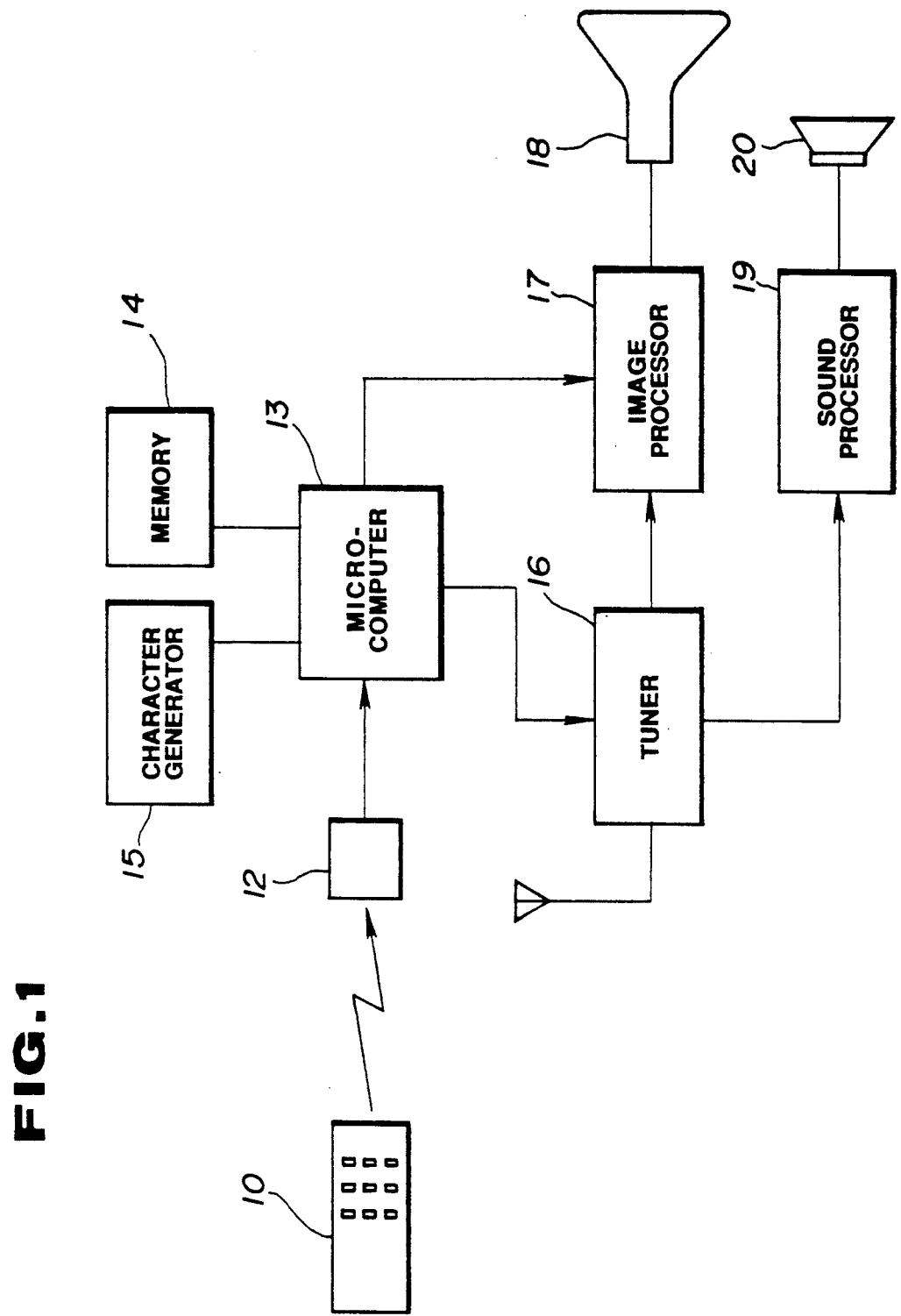
FIG. 1 is a schematic diagram showing one embodiment of a television channel selection apparatus made in accordance with the invention.

With reference to the drawings, and in particular to FIG. 1, there is shown a schematic diagram of a television channel selection apparatus embodying the invention. The television channel selection apparatus is shown as used with a television receiver having a number of available television channels or stations. The television channel selection apparatus includes a commander 10 used for controlling the television receiver at a position remote from the television receiver. The commander 10 has a number of pushbuttons provided on a pushbutton pad 11, shown in FIG. 2. When one of the pushbuttons is depressed, the commander 10 produces an infrared ray signal corresponding to the depressed pushbutton.

Figures 2, 3:
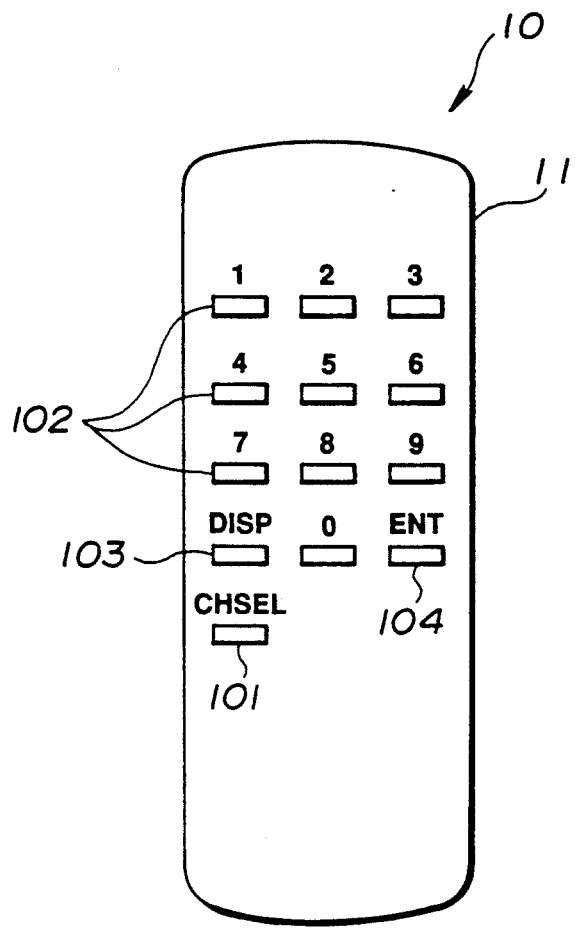
FIG. 2 shows a pushbutton pub provided on the commander used in the television channel selection apparatus of FIG. 1.
FIG. 3 is a diagram showing one example of channel guide menu.

Referring to FIG. 2, the pushbuttons includes a first pushbutton and a group of second pushbuttons. The first pushbutton is a channel selection (CH SEL) pushbutton 101. The second pushbuttons, which are referred to as caption pushbuttons, include the numerical digit (0–9) pushbuttons 102, the display (DISP) pushbutton 103 and the input (ENT) pushbutton 104. The pushbutton pad 11 also has a power pushbutton, volume pushbuttons and other pushbuttons. Such pushbuttons are well known in the art and are not illustrated.

Returning to FIG. 1, the television channel selection apparatus also includes an infrared ray receipt element 12 provided on the television receiver. The infrared ray receipt element 12 receives the infrared ray signal transmitted from the commander 10 and converts it into a corresponding electric signal for application to a microcomputer 13. The microcomputer 13 communicates with a memory 14 and also with a character generator 15. The memory 14, which may be taken in the form of an EEPROM, stores a television channel list of channel numbers in relation to captions representing the names or abbreviations of the respective registered television channels or stations. The channel numbers correspond to the respective caption pushbuttons. The character generator 15 operates, on command from the microcomputer 13, to provide a character pattern used in displaying the television channel list on the television receiver.

The microcomputer 13 communicates with a tuner 16 and also with an image processor 17. When the microcomputer 13 receives an electrical signal, which is produced from the infrared ray receipt element 12 when the first pushbutton 101 is depressed on the pushbutton pad 11, it produces an on-screen display signal causing the image processor 17 to display the television channel list on a cathode ray tube (CTR) 18 together with an image signal fed thereto from the tuner 6. When the microcomputer 13 receives an electrical signal, which is produced from the infrared ray receipt element 12 when one of the second or caption pushbuttons is depressed on the pushbutton pad 11, it produces a channel selection command causing the tuner 16 to select a specified television channel. The tuner 16 is also connected through a sound processor 19 to a loudspeaker 20.

Referring to FIG. 3, there is illustrated one example of "CHANNEL GUIDE" menu which is displayed on the cathode ray tube 18 when the channel selection (CH SEL) pushbutton 101 is depressed. The "CHANNEL GUIDE" menu includes channel numbers represented by the numerical digits 0 to 9 corresponding to the respective numeral digit pushbuttons 102, the letter "D" corresponding to the display (DISP) pushbutton 103 and the letter "E" corresponding to the enter (ENT) pushbutton 104. The "CHANNEL GUIDE" menu also includes the names or abbreviations of the registered television channels or stations on the right sides of the respective numerical digits 0 to 9. The names or abbreviations of additional television stations may be listed on the right sides of the respective letters "D" and "E". The letter "n" included in the "CHANNEL GUIDE" menu indicates the number of the displayed page of the "CHANNEL GUIDE" menu.

Figures 4, 5:
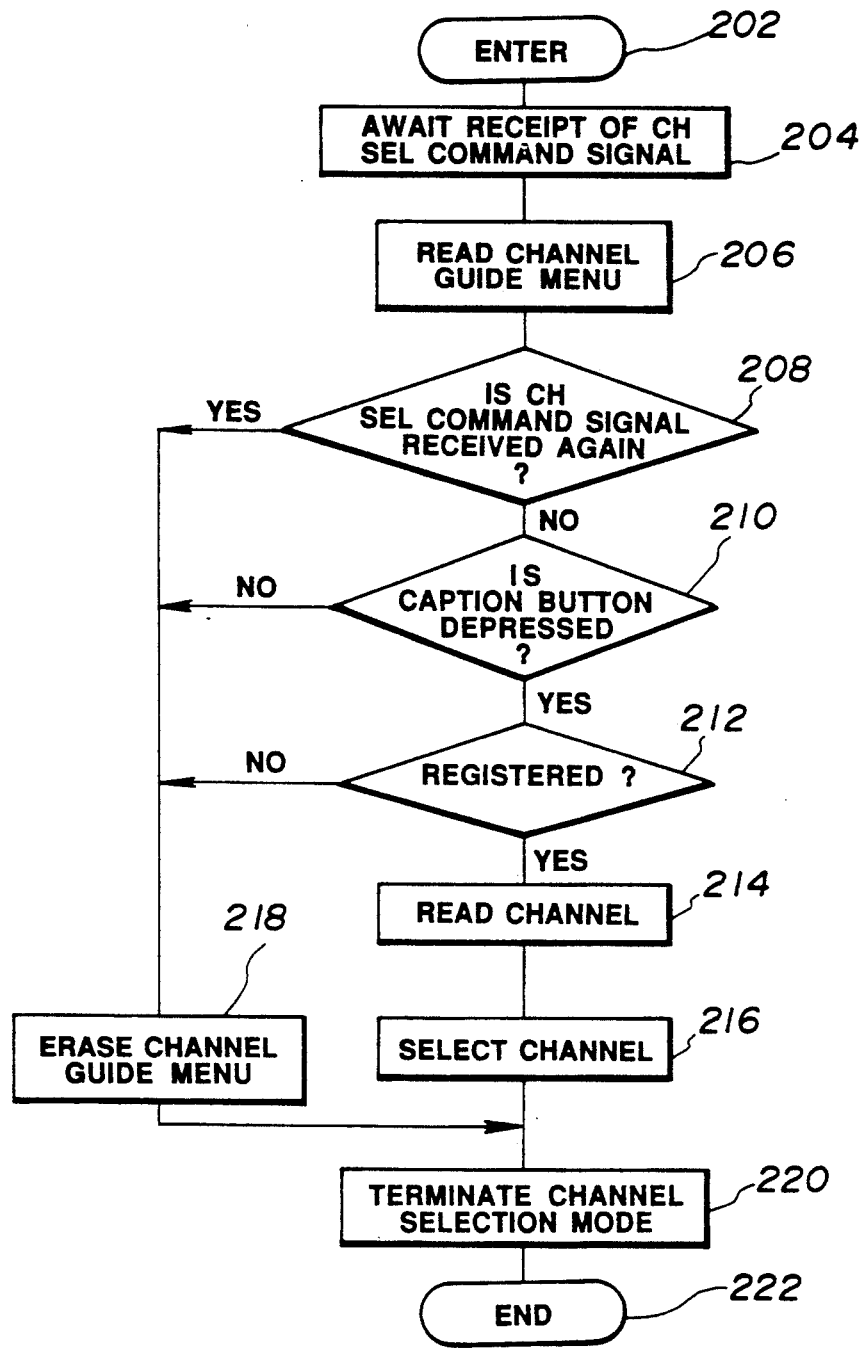
FIG. 4 is a flow diagram showing the programming of the digital computer as it is used to select a desired television channel from the pushbutton pad.
FIG. 5 is a diagram showing a set of pushbuttons used to set required captions.

FIG. 4 is a flow diagram illustrating the programming of the microcomputer 13 as it is used to select a desired television channel. The microcomputer program is entered at the point 202. At the point 204 in the program, the microcomputer awaits the receipt of a channel selection command signal. The infrared ray receipt element 12 produces this channel selection command signal to the microcomputer 13 when it receives an infrared ray generated from the commander 10 when the channel selection (CH SEL) pushbutton 101 is depressed. After the receipt of the channel selection command signal, at the point 206, the microcomputer 13 reads the "CHANNEL GUIDE" menu out of the memory 14 and displays the read "CHANNEL GUIDE" menu on the cathode ray tube 18. Following this, the microcomputer 13 awaits the receipt of another signal from the infrared ray receipt element 12. The operator can confirm the relation of the caption pushbuttons "0" to "9", "D" and "E" to the respective registered television channels and select a desired television channel by depressing an appropriate one of the caption pushbuttons.

At the point 208 in the program, a determination is made as to whether or not the channel selection command signal is fed again from the infrared ray receipt element 12. If the answer to this question is "yes", then it means that the operator depressed the channel selection (CH SEL) pushbutton 101 again and the program proceeds to the point 218. Otherwise, the program proceeds to another determination step at the point 210. This determination is as to whether or not one of the caption pushbuttons is depressed for a predetermined period of time after the receipt of the channel selection command signal. If the answer to this question is "yes", then the program proceeds to the point 212. Otherwise, the program proceeds to the point 218. At the point 212 in the program, a determination is made as to whether or not any television channel is registered for the channel number corresponding to the depressed caption pushbutton. If the answer to this question is "yes", then the microcomputer 13 reads the desired television channel at the point 214 and produces a command causing the tuner 16 to select the desired television channel at the point 216. After the selection of the desired television channel, the program proceeds to the point 220. If the answer to the question inputted at the point 212 is "no", then the program proceeds to the point 218 where the microcomputer 13 produces a command to erase the "CHANNEL GUIDE" menu displayed on the cathode ray tube 18 and then to the point 220. At the point 220 in the program, the microcomputer 13 produces a command to terminate the direct channel selection. Following this, the program proceeds to the end point 222.

Referring to FIG. 5, there is shown a set of pushbuttons used to set required captions. These pushbuttons, which may be provided on the commander 10 or the television receiver, include an UP pushbutton (Δ), a DOWN pushbutton (∇), an input (ENTER) pushbutton, a guide menu (GUIDE) pushbutton, an end (EXIT) pushbutton, and a reset (RESET) pushbutton. The signals from these pushbuttons are fed to the microcomputer 13.

Figure 6A:
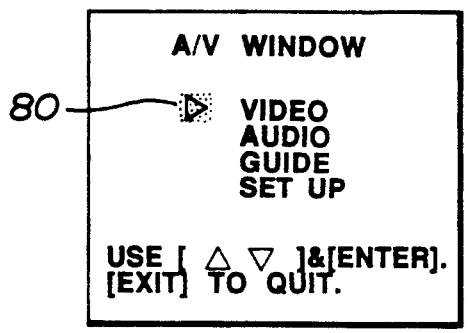
FIGS. 6A to 6F are diagrams showing visual indications displayed during the caption setting process.
Figure 6B:
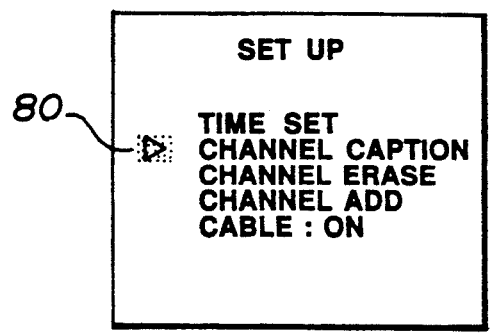
Figure 7A:
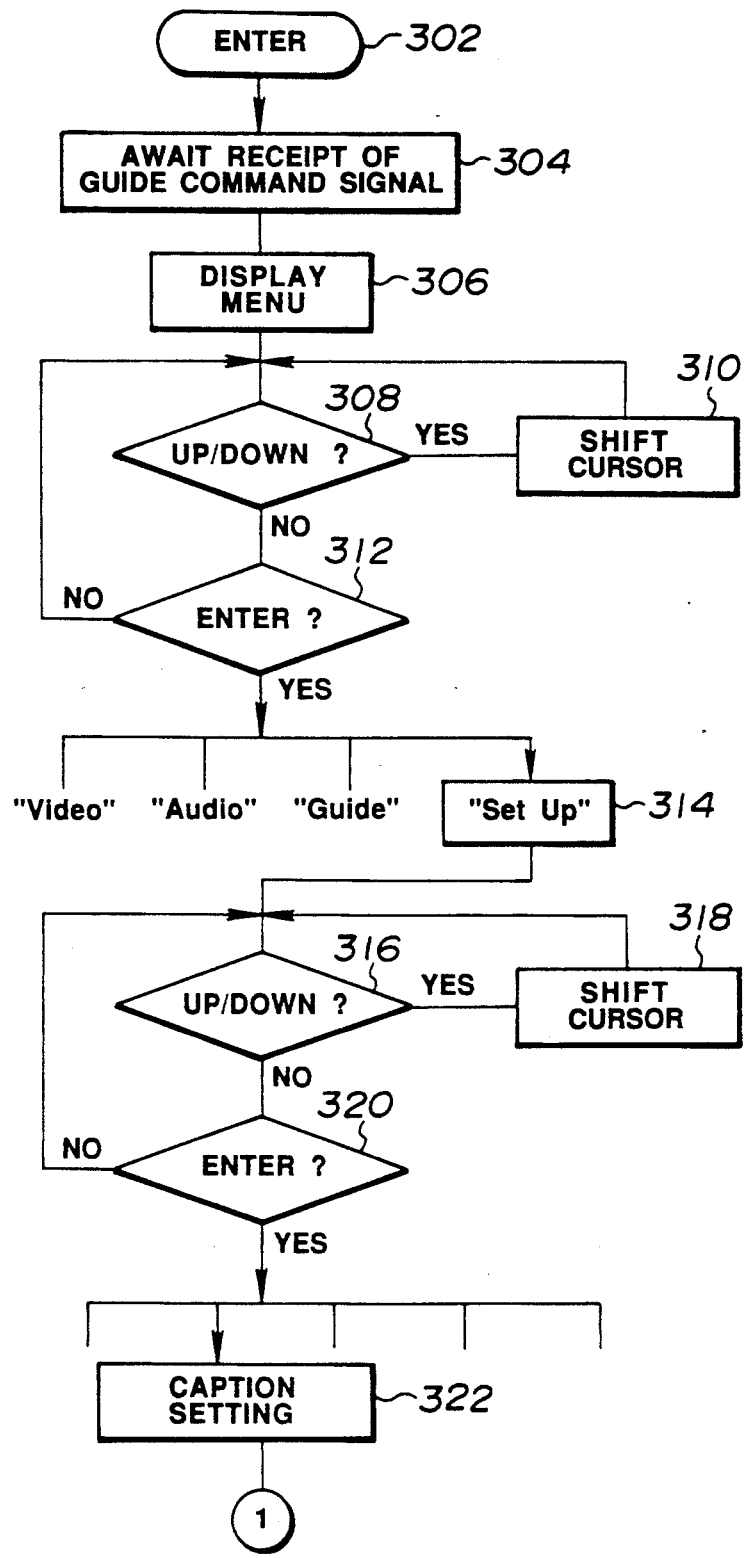
FIGS. 7A to 7C to are flow diagrams showing the programming of the digital computer as it is used to set the captions.
Figure 7B:
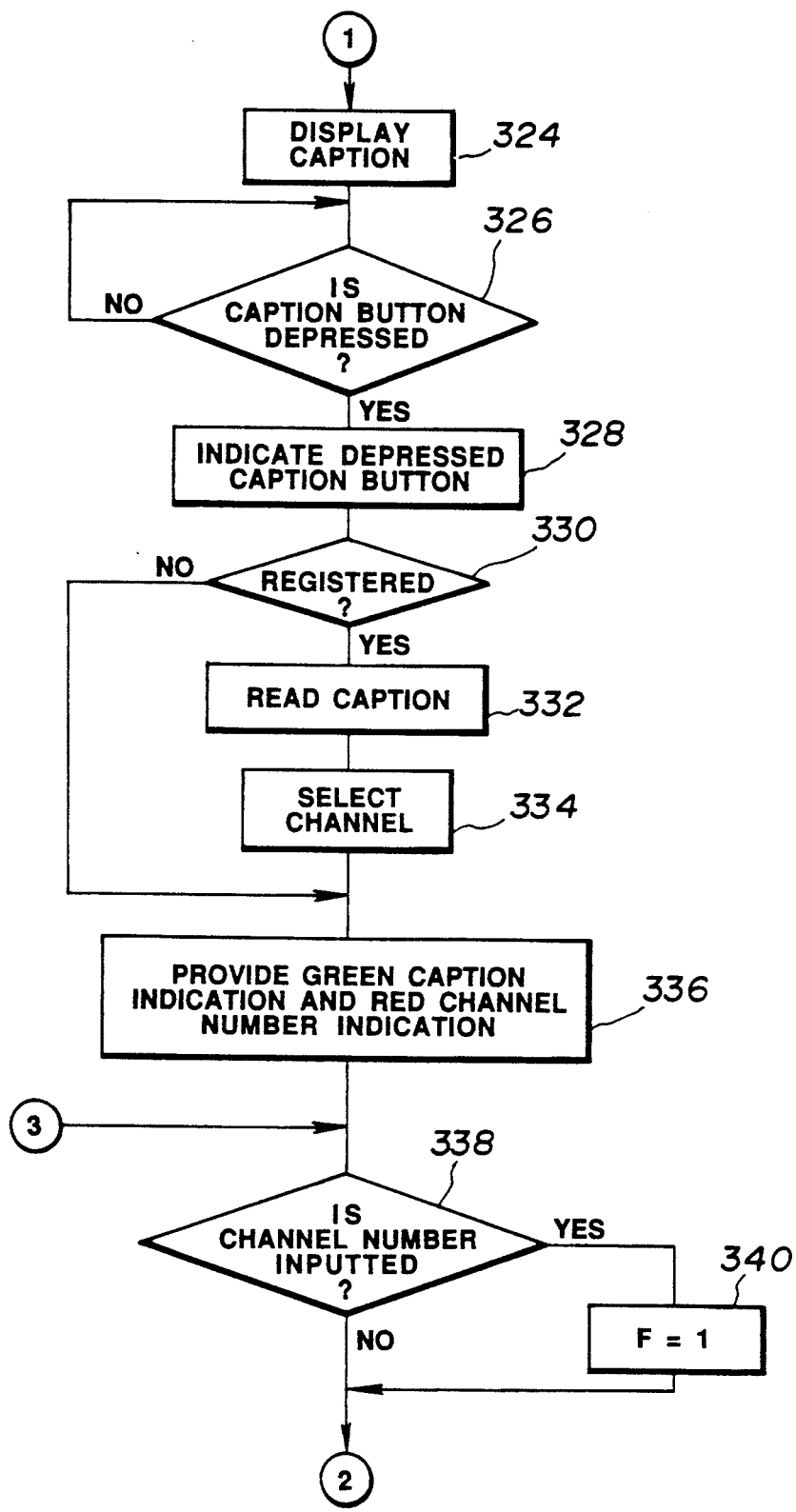
Figure 7C:
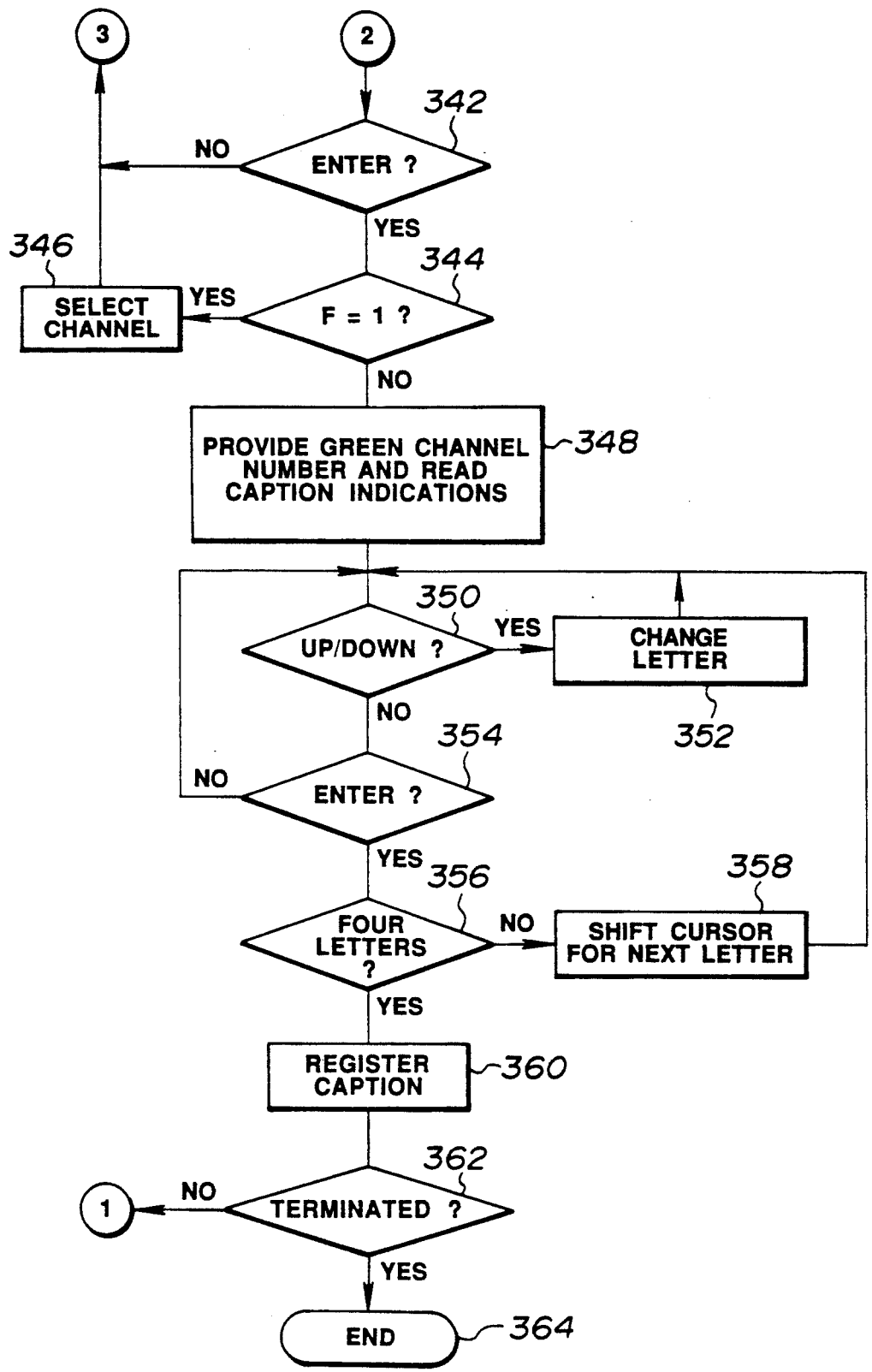

FIGS. 7A, 7B and 7C are flow diagrams illustrating the programming of the microcomputer 13 as it is used to set the required captions. The computer program is entered at the point 302. At the point 304 in the program, the microcomputer 13 awaits the receipt of a guide command signal. The guide command signal is produced when the guide menu (GUIDE) pushbutton is depressed. After the receipt of the guide command signal, at the point 306, the microcomputer 13 produces a command to display a "A/V WINDOW" menu on the cathode ray tube 18. One example of "A/V WINDOW" menu is shown in FIG. 6A. In this menu, the numeral 80 indicates a cursor position indicator. The operator can change the cursor position by depressing the UP or DOWN pushbutton. At the point 308 in the program, a determination is made as to whether or not the UP or DOWN pushbutton is depressed. If the answer to this question is "yes", then the program proceeds to the point 310 where the cursor is shifted to another position and then to the point 308. The cursor is shifted upward when the UP pushbutton is depressed and downward when the DOWN pushbutton is depressed. In this case, the UP or DOWN pushbutton is depressed to select the "SET UP" menu from the "A/V WINDOW" menu. At the point 312 in the program, a determination is made as to whether or not the input (ENTER) pushbutton is depressed. If the answer to this question is "no", then the program is returned to the point 308. If the input (ENTER) pushbutton is depressed, then the program proceeds to the point 314 where the microcomputer 13 selects the "SET UP" menu and displays the "SET UP" menu on the cathode ray tube 18. FIG. 6B shows one example of "SET UP" menu.

Figure 6C:
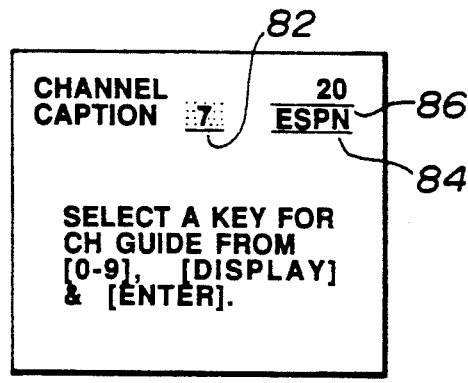

At the point 316 in the program, a determination is made as to whether or not the UP or DOWN pushbutton is depressed. If the answer to this question is "yes", then the program proceeds to the point 318 where the cursor is shifted to another position and then to the point 316. The cursor is shifted upward when the UP pushbutton is depressed and downward when the DOWN pushbutton is depressed. In this case, the UP or DOWN pushbutton is depressed to select an option "CHANNEL CAPTION SETTING" from the "SET UP" menu. At the point 320 in the program, a determination is made as to whether or not the input (ENTER) pushbutton is depressed. If the answer to this question is "no", then the program is returned to the point 316. If the input (ENTER) pushbutton is depressed, then the microcomputer 13 selects the option "CHANNEL CAPTION" at the point 322 and displays a "CHANNEL CAPTION" menu at the point 324. One example of "CHANNEL CAPTION" menu is shown in FIG. 6C. In this menu, the numeral 82 designates a caption indicator which indicates the present caption pushbutton, the numeral 84 designates a channel indicator which indicates the corresponding television channel, and the numeral 86 designates a channel number indicator which indicates the corresponding channel number.

Figure 6D:
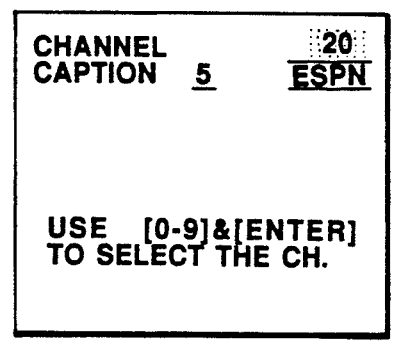

The microcomputer 13 awaits for an operator's operation to depress one of the caption pushbuttons "0" to "9", "D" and "E". At the point 326 in the program, a determination is made as to whether or not one of the caption pushbuttons "0" to "9", "D" and "E" is depressed. If the answer to this question is "yes", then the program proceeds to the point 328. Otherwise, the program is returned to the point 326. At the point 328 in the program, the microcomputer 13 produces a command causing the caption indicator to indicate the depressed caption pushbutton. At the point 330 in the program, a determination is made as to whether or not a caption is registered for the depressed caption pushbutton. If the answer to this question is "yes", the microcomputer 13 reads the caption from the memory 14 at the point 332 and selects the corresponding television channel at the point 334. Following this, the program proceeds to the point 336. If no caption is registered for the depressed caption pushbutton, then the program proceeds from the point 330 directly to the point 336. At the point 336 in the program, the microcomputer 13 awaits for the receipt of an electrical signal indicative of a specified channel number. In this case, the caption indicator 82 provides a green indication and the channel number indicator 86 provides a red indication, as shown in FIG. 6D.

Figure 6E:
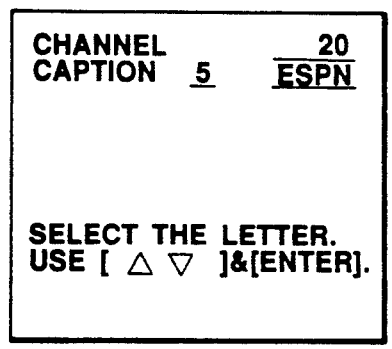
Figure 6F:
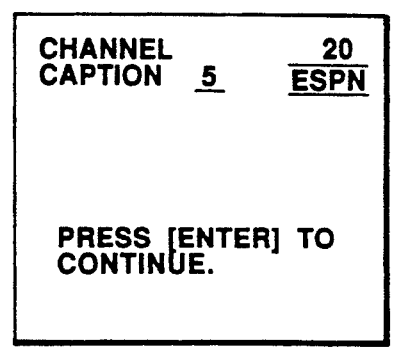

At the point 338 in the program, a determination is made as to whether or not one or two of the caption pushbuttons are depressed to input a channel number. If the answer to this question is "yes", then the program proceeds to the point 340 where a flag is set to indicate that a channel number has been inputted. Following this, the program proceeds to the point 342. If no channel number is inputted, then the program proceeds directly to the point 342. A the point 342 in the program, a determination is made as to whether or not the input (ENTER) pushbutton is depressed. If the answer to this question is "yes", then the program proceeds to the point 344. Otherwise, the program is returned to the point 338. At the point 344 in the program, a determination is made as to whether or not the flag has been set. If the answer to this question is "yes", then the program proceeds to the point 346 where the microcomputer 13 produces a command to select the television channel specified by the channel number. If the flag remains cleared, then the program proceeds from the point 344 to the point 348 where the microcomputer 13 produces a command to display an indication, as shown in FIG. 6E. In this indication, the channel number indicator 86 provides a green indication and the channel indicator 84 provides a red indication. The microcomputer 13 awaits for the receipt of an electric signal representing an alphabetical letter. At the point 350 in the program, a determination is made as to whether or not the UP or DOWN pushbutton is depressed. If the answer to this question is "yes", then the program proceeds to the point 352 where the next alphabetical letter is selected and then to the point 350. If neither UP nor DOWN pushbutton is depressed, then the program proceeds to another determination step at the point 354. This determination is as to whether or not the input (ENTER) pushbutton is depressed. If the answer to this question is "yes", then the program proceeds to the point 356. Otherwise, the program is returned to the point 350. At the point 356 in the program, a determination is made as to whether or not four alphabetical letters have been inputted. If the answer to this question is "no", then the program proceeds to the point 358 where the cursor is shifted for the position at which the next alphabetical letter is inputted and then to the point 350. If four letters have been inputted to complete the caption, then the program proceeds from the point 356 to the point 360 where the completed caption is stored into the memory 14. The microcomputer 13 produces a command to display an indication on the cathode ray tube 18, as shown in FIG. 6F. After the registration of the completed caption, the program proceeds to a determination step at the point 362. This determination is as to whether or not the EXIT pushbutton or the input (ENTER) pushbutton is depressed. If the EXIT pushbutton is depressed, then the proceeds to the end point 364. Otherwise, the program is returned to the point 324. This program may be arranged to proceeds to the end point 324 from the point 362 if no pushbutton is depressed for a predetermined period of time.

The "CHANNEL GUIDE" menu may be divided into a plurality of pages to display 13 or more television channels available for the television receiver.

According to the invention, the television receiver is controlled from the pushbutton pad. The first pushbutton may be depressed to display a television channel list on the television receiver. The operator can depress one of the second pushbuttons to directly select a desired television channel while seeing the television channel list.

While this invention has been described in conjunction with a specific embodiment thereof, it is evident that many alternatives, modifications and variations will be apparent to those skilled in the art. For example, the commander 10 may be of the wired type. Furthermore, the pushbutton pad 11 may be provided on the television receiver. Accordingly, it is intended to embrace all alternatives, modifications and variations that fall within the scope of the appended claims.

What is claimed is:

1. A television channel selection apparatus for use with a television receiver having a display and receiving a number of available television channels, comprising:
   a first pushbutton provided on a pushbutton pad and means for producing a first command signal upon said first pushbutton being depressed;
   information processing means responsive to the first command signal for displaying a television channel list on the display of the television receiver, the television channel list including channel numbers corresponding to the respective available television channels;
   a plurality of second pushbuttons provided on the pushbutton pad and means for selectively producing one of a plurality of second command signals, said plurality of second command signals corresponding respectively to the listed channel numbers displayed following depression of said first pushbutton;
   wherein said information processing means responds to the selectively produced second command signal and selects a television channel corresponding to the channel number selected by the second command signal.

2. The television channel selection apparatus as claimed in claim 1, wherein the television channel list includes channel numbers and the network names of the corresponding television channels.

3. The television channel selection apparatus as claimed in claim 1, wherein the television channel list includes channel numbers and the network abbreviations of the corresponding television channels.

* * * * *